INVENTOR.
RENNY RUDOLPH DAVIS

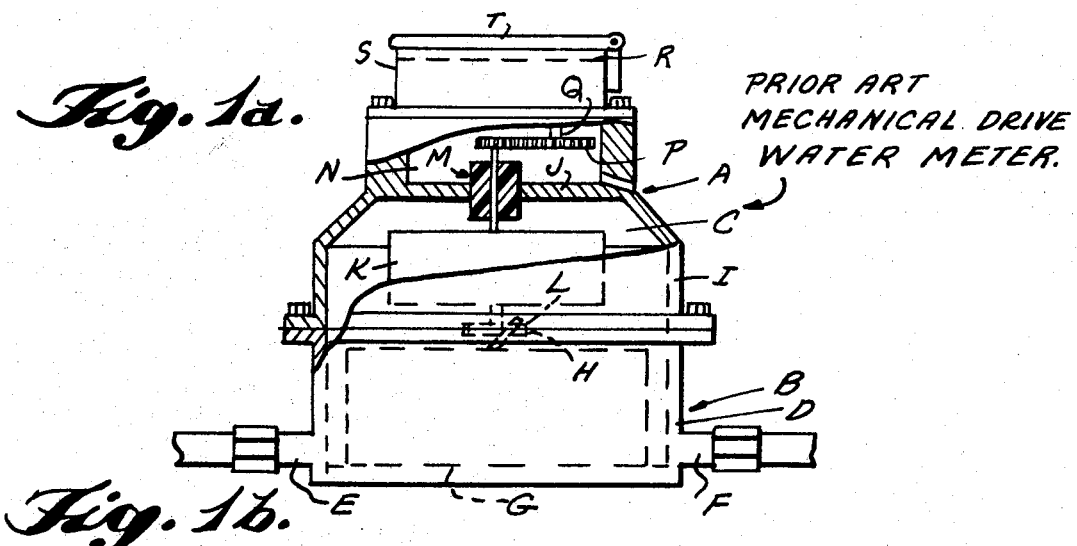
Fig. 1a. PRIOR ART MECHANICAL DRIVE WATER METER.
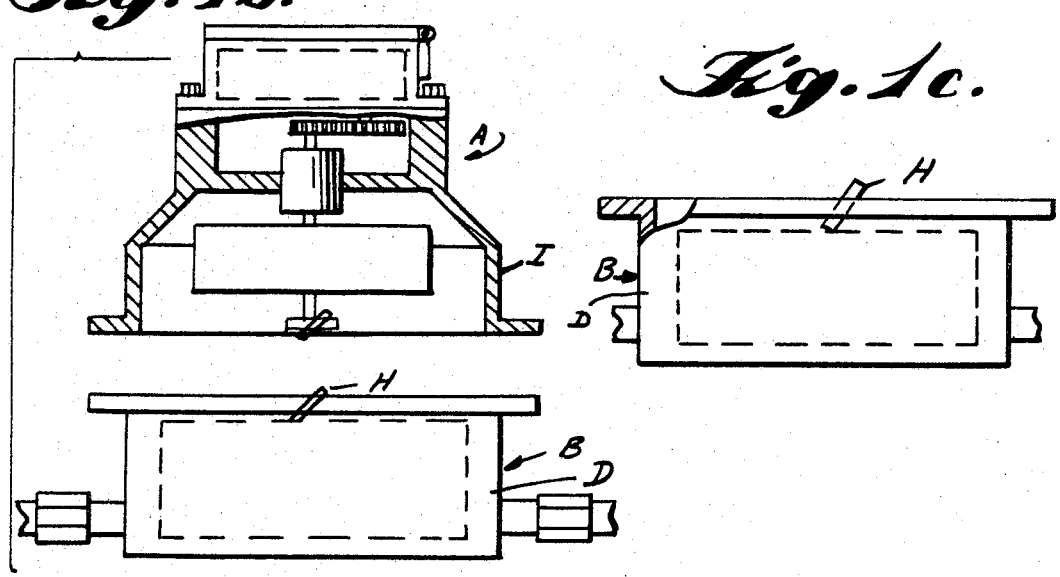
Fig. 1b.
Fig. 1c.
Fig. 1d. CONVERSION UNIT OF PRESENT INVENTION
INVENTOR.
RENNY RUDOLPH DAVIS
BY
Cushman Darby & Cushman
ATTORNEYS

United States Patent Office 3,435,679
Patented Apr. 1, 1969

3,435,679
CONVERSION UNIT FOR CONVERTING MECHANICAL DRIVE WATER METERS TO MAGNETIC DRIVE
Renny Rudolph Davis, Thomasville, Ga., assignor to Davis Industries, Inc., Thomasville, Ga., a corporation of Georgia
Filed Aug. 9, 1967, Ser. No. 659,470
Int. Cl. G01f 3/08
U.S. Cl. 73—258        4 Claims

ABSTRACT OF THE DISCLOSURE

A universal conversion unit for converting any of the various conventional mechanical-drive water meters to a magnetic-drive meter having no stuffing box or the like in the transmission. The conversion unit includes a blind flange carrying a rotatable magnet which is mounted close to the undersurface of the flange, a combined gear-reduction and register unit mounted on top of the blind flange opposite the magnet and a second rotatable magnet disposed between the reduction and register unit and the top of the flange so as to drive the unit when the first magnet is rotated. To employ the conversion unit, the upper portion of the housing of a conventional water meter together with its associated parts is removed and replaced by the conversion unit. The lower surface of the conversion unit flange is adapted to be connected to the upper edge of the lower housing portion of the existing meter. By slightly varying the contours of the lower edge of the conversion unit housing the conversion unit will fit the lower housing portion of almost all mechanical drive meters currently in use.

---

This invention relates to water meters and more particularly to means for converting certain semi-obsolete meters to an up-to-date design. Specifically, the invention relates to a conversion unit adapted to convert existing mechanical-drive water meters to magnetic-drive water meters.

Water meters for use on water utility services of ½-inch to 2-inch size are usually of the volumetric displacement type. Measurement is accomplished by the action of the flowing water on a movable piston, of nutating or oscillating type, moving within a measuring chamber. A driver pin, attached centrally to the piston moves with the piston and transmits rotary motion to a reading register or index through a speed-reducing gear train which has a reduction ratio such that the initial hand of the register will make one revolution for a predetermined quantity of water, such as one cubic foot, ten gallons or other unit.

In meters intended for long-term use, means is also provided to modify the speed reduction ratio to compensate for wear in the piston and chamber. This means is conventionally in the form of a pair of so-called change gears forming part of the reduction gear train and located so as to be accessible without disassembling the entire gear train. The two intermeshing change gears are adapted to be easily removed from their shafts and are replaceable with similar gears having different numbers of teeth so that the ratio of the speeds of the driver and driven gear of the pair may be varied as needed.

The measuring mechanism, which includes the nutating piston or its equivalent and appropriate wall structure forming the measuring chamber, resides in a measuring compartment which is filled with water during operation of the meter. The measuring compartment is defined by the walls of a meter casing or housing, the latter having an inlet port and an outlet port for connection into the water line. The walls of the measuring device cooperate with these ports so that water entering the measuring compartment flows through the device. Meters intended for use in locations where possible freezing of the water within the meter is not encountered, are built in the so-called split-case type which has a relatively small top casing part releasably connected with bolts to a bottom casing part. The measuring mechanism is disposed in the lower portion of the measuring compartment, which is defined by the two casing parts, and is supported within the bottom casing part. The inlet and outlet ports are also provided in the bottom casing part. Meter casings for use where freezing may occur are also constructed of two parts and again the measuring mechanism is disposed in the measuring compartment. However, in this construction, the top casing, which is relatively large, surrounds the measuring mechanism and is provided with the inlet and outlet ports. The bottom casing part is in the form of a relatively small, bolted-on bottom cap designed to break if the water in the chamber and casing expands upon freezing. This type of meter, an example of which is disclosed in expired Patent 1,567,345, issued Dec. 29, 1925, is known as a frost-bottom type.

Most water meters made in the United States since about 1921 and all those with which the present invention is concerned, are built to comply with the standard specifications for displacement type water meters of the American Water Works Association. These specifications set standards for nominal sizes, capacity, external dimensions, accuracy, types of registers and other details. Compliance with these specifications results in a degree of uniformity of some parts and similarity of other parts of the meter design among all brands and sizes.

Until recently, the transmission of movement from the measuring mechanism to the register was accomplished by means of (1) a reducing gear train located within the water-filled measuring compartment of the meter and actuated mechanically by the driving pin, (2) a rotating shaft passing through a stuffing box provided in an aperture in a wall of the upper casing part, (3) a pair of change gears of the kind previously described, disposed in a normally water-free compartment and (4) the register itself which converts the rotary input to a reading on a suitable dial. Much difficulty has been encountered with these meters due to wear in the reduction gear train, leakage and wear of stuffing box packing and damage to the register from moisture entering the register compartment from stuffing box leakage and from water and foreign matter entering the register compartment by way of a drainage vent or non-gasketed joints. These difficulties result in loss of registration of the water which has been measured by the measuring mechanism, causing loss of revenue to the water utility and necessitating substantial and frequent repair costs.

In the last few years almost all United States manufacturers have adopted a magnetic drive for transmitting motion from the measuring mechanism to the register, thereby avoiding the use of a stuffing box and the difficulties associated therewith. In this type of water meter the driving pin of the measuring mechanism mechanically rotates a permanent driver magnet located within the water-filled measuring compartment of the meter and placed close to the inner face of a wall of the upper casing part, this wall being constructed of non-magnetic material, usually but not necessarily copper alloy. Opposite this wall, parallel and close to it but outside the water-filled measuring compartment is a driven magnet so located that the magnetic flux density produced by the rotation of the driver magnet causes a similar rotation of the driven magnet. The driven magnet is operationally connected to the register through a train of gears which combines the functions performed in the mechanical drive meter by the reduction gear train plus the register. The change gears are incorporated into this combined speed-reduction and register unit.

Now, I have discovered that the similarity of the various brands of water meters is such that many brands of old mechanical drive meters of the aforementioned split-case type can be converted to magnetic drive, that is to a system containing no stuffing box, by the use of one common, or universal conversion unit, containing a driver magnet and a combined driven magnet, gear reduction train, change gear train and register assembly, all these parts together with a special connector flange being connected together. The complete assembly, as a unit, replaces the upper casing part of the old mechanical drive meter together with the parts associated therewith, that is, the reduction gear train which resided in the measuring compartment, the stuffing box, the change gears and the register. The lower casing part of the old meter, containing the measuring mechanism, is retained. The special connector flange is a blind flange which fits the upper edge of the lower casing part of the old meter, thereby closing the measuring compartment and defining the top wall thereof. To this end the shape and lower surface contours of the connector flange require minor variations of dimensions to permit assembly onto the varying dimensions of the existing bottom casings and measuring mechanism of the old meter. Around the periphery of the connector flange are bolt holes so located that they align with the bolt holes in the lower casing part of the old meter. Centrally located on the lower surface of the connector flange is the rotatable driver magnet which cooperates mechanically with the drive pin of the measuring mechanism. Centrally located on the upper surface of the connector flange is the aforementioned combination of driven magnet, reduction train, change gears and register.

When the conversion unit of the present invention is to be used with an old meter of the aforementioned frost-bottom type, the connector flange is provided with a solder-type lower peripheral edge rather than with a connection suitable for receiving bolts. Conversion is accomplished by first unbolting the bottom cap and temporarily removing the measuring mechanism through the opening thus formed. Then the upper portion of the casing is cut off above the level of the measuring mechanism, the connector flange of the conversion unit is fitted to the upper edge of the remaining casing and then the edges are soldered or brazed together. Finally, the measuring mechanism is replaced in the measuring compartment and the bottom cap is bolted onto the bottom of the old casing.

The invention will be further understood from the following detailed description of an illustrative example taken with the drawings in which:

FIGURES 1a, 1b, 1c, 1d and 1e are schematic elevational views, partly broken away, illustrating the steps of converting a mechanical-drive water meter to a magnetic-drive meter by the use of a conversion unit embodying the principles of the present invention;

Figure 1E:
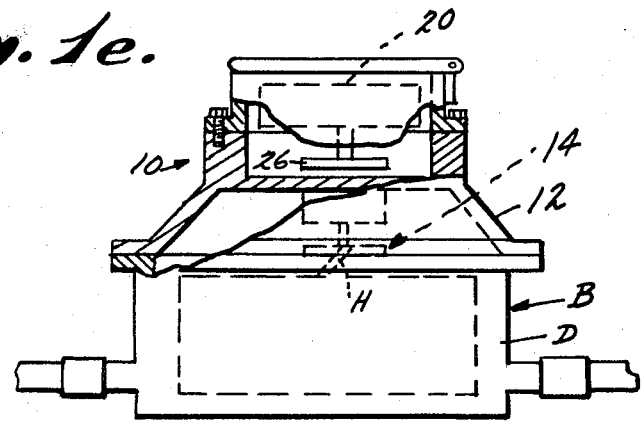

Referring to FIGURES 1a, 1b, 1c, 1d and 1e, there is shown schematically a sequence of steps which is appropriate for converting an existing mechanical-drive water meter to a magnetic-drive meter, using a conversion unit which is constructed in accordance with the principles of the present invention. The existing water meter, which is illustrated in FIGURES 1a and 1b as a typical meter of the aforementioned split-case type, comprises upper and lower assemblies A and B which are bolted together to define between them a normally water-filled measuring compartment C. The lower assembly B includes a lower casing part D provided with a water inlet port E and a water outlet port F and supporting a water measuring mechanism G, such as a measuring chamber containing a nutating disc device. As is conventional, the measuring mechanism includes an inclined drive pin H which in operation of the meter revolves about a vertical axis. The details of the mechanism G are not illustrated inasmuch as they are conventional. The old meter need not be removed from the utility water line for conversion and, as shown, the ports E and F may remain connected to the line.

The upper assembly A of the conventional meter includes an upper casing part I having a horizontal partition wall J which defines the upper wall of the measuring compartment C. Disposed within the measuring compartment C and supported by the upper casing part I is a gear reduction train K which receives a rotary input from the pin H through the mechanical cooperation of the pin H with a rotatable member L carried by the gear train K. The rotary output of the reduction gear train K is transmitted through the wall J by means of a shaft and stuffing box assembly M. The upper end of the shaft terminates in a normally water-free compartment N and carries one of a pair of change gears P. The other gear is mounted on a shaft Q which forms the rotary input to a register R carried within a register housing S having a hinged cover T.

Conversion of the existing meter to a magnetic-drive meter is effected by first unbolting and removing the upper casing part I (FIGURE 1b) thereby having the lower casing part D with its upper edge exposed (FIGURE 1c). Then a conversion unit 10, embodying the principles of the present invention, is fitted to the upper edge of the lower casing part D (FIGURE 1d) and bolted in place (FIGURE 1e). As previously described, the conversion unit 10 includes a special connecting flange 12 which is a blind flange having a lower surface and lower edge which are adapted to fit the lower casing part D of the old meter.

Figure 2:
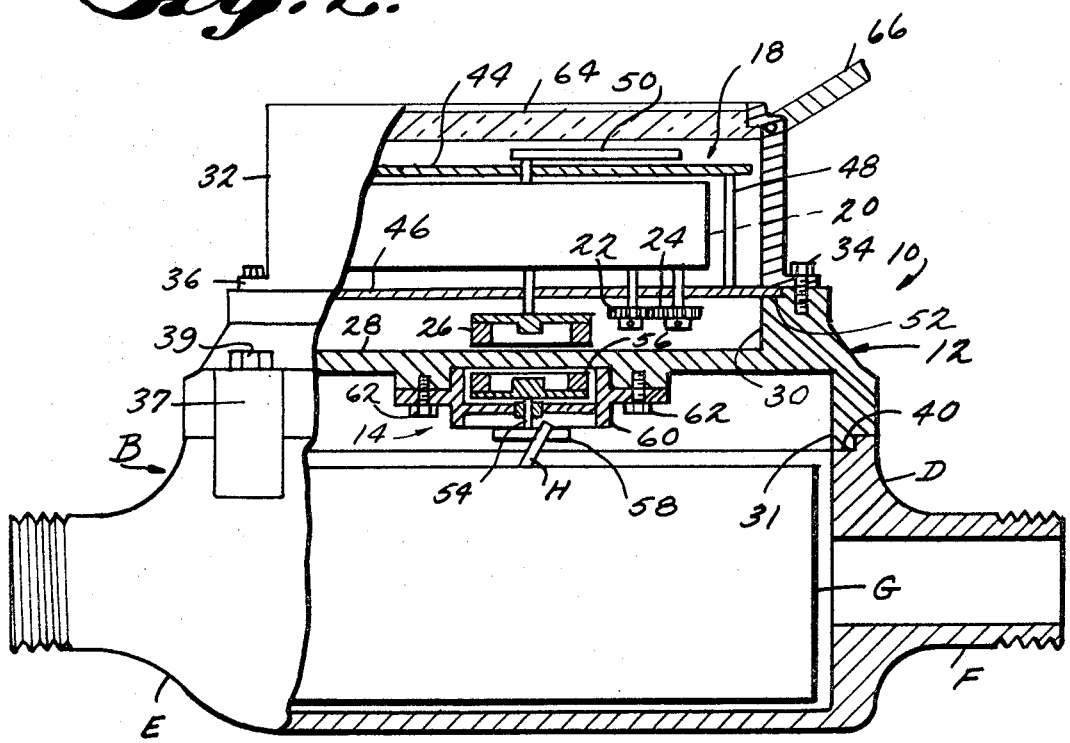
FIGURE 2 is a detail elevational view of, partly broken away, a converted water meter including the lower half of an old meter and as its upper half, a conversion unit embodying the principles of the present invention.
Figure 3:
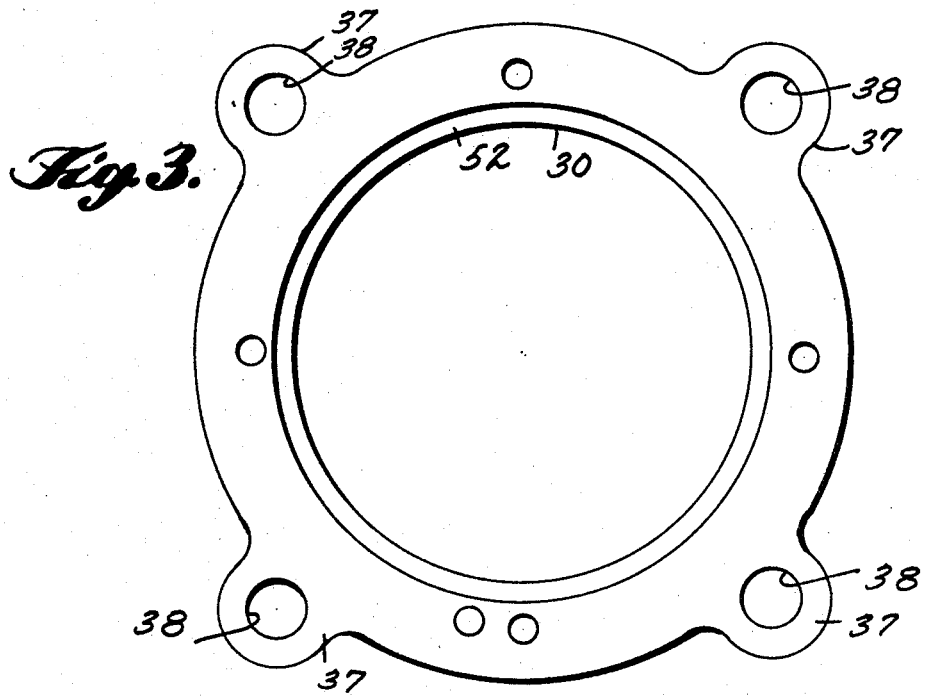
FIGURE 3 is a plan view of the connector flange of teh conversion unit of FIGURE 2.
Figure 4:
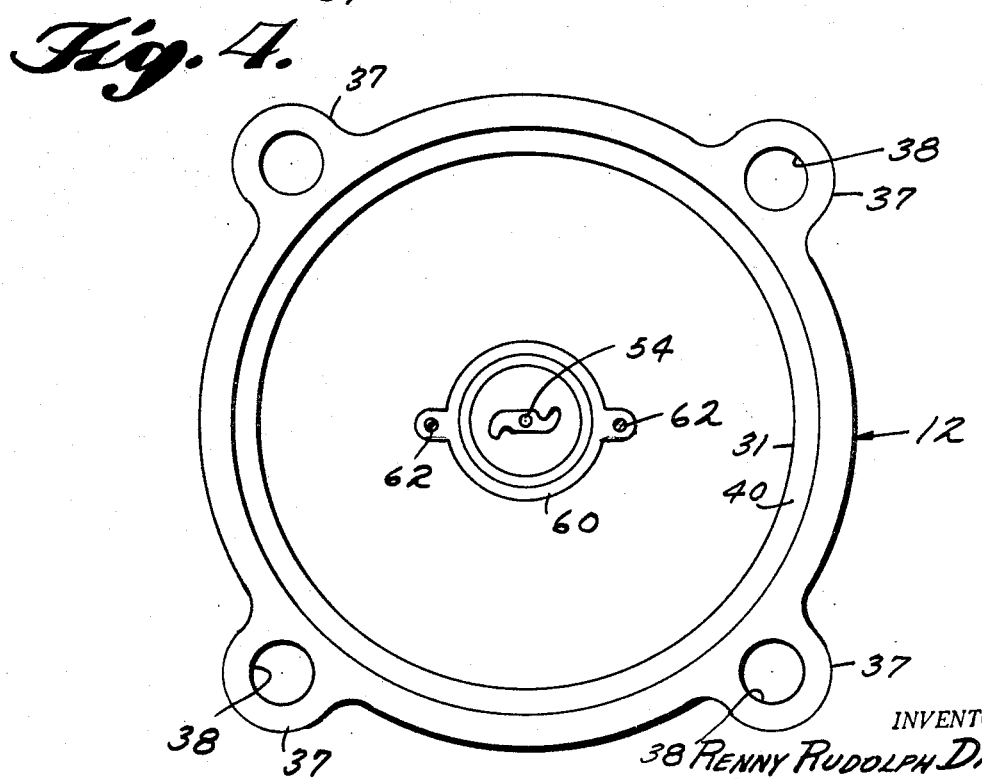
FIGURE 4 is a bottom view of the connector flange of the conversion unit of FIGURE 2.

FIGURES 2, 3 and 4 show the details of the particular conversion unit 10 illustrated schematically in FIGURES 1d and 1e. Referring first to FIGURE 2 which shows the conversion unit 10 in its operative position relative to the lower casing part D of the old meter, it will be seen that the special connector flange 12 serves both to close the opening in the top of the existing casing part D and to support the other parts of which the unit 10 consists, these parts being a driver magnet assembly 14 and a combined assembly 18 of register 20, change gears 22, 24 and driven permanent magnet 26. The connector flange 12 is blind, that is, it includes an imperforate top wall 28 which in the illustrated embodiment is surrounded by an upstanding annular wall 30 and a depending annular wall 31. The annular wall 30 supports a register housing 32 which conveniently is held in place by screws 34 passing through a laterally extending flange 36 on the register housing 32. The depending annular wall 31 is of greater diameter than the remainder of the flange 12 and is provided with radially extending bosses 37 having bolt holes 38 therethrough for receiving bolts 39 which may be screwed into the existing bolt holes in the lower casing part D.

The lower surface of the connector flange 12 is complementary to the upper edge of the existing casing part D, this feature being accomplished by slight modifications of the contours of the basic flange 12 consistent with the shape of the old meter. As stated previously, almost all mechanical-drive meters constructed in the United States since about 1921 have generally similar casings so that it is a relatively simple matter to modify the contour of the lower surface of the basic connector flange 12 to fit a particular brand of meter. In practice the flange 12 is cast of a non-magnetic metal, such as brass, in a form having the imperforate wall 28, the annular walls 30 and 31 and the proper number and location of bolt holes 38 and then the wall 31 is machined to fit the particular casing part D. In the particular construction illustrated the wall 31 includes a depending rib 40 which fits into a complementary recess 42 (FIGURE 4) and serves to align the flange 12 with the casing part D. The wall 31 is necessary to provide space for the magnet assembly 14, while the wall 30 is not strictly necessary because the driven magnet 26 and the change gears 22 and 24 can be located within the register housing 32.

The driver magnet assembly 14 and the assembly 18 and their general relationship to the partition wall 28 are necessary features of the conversion unit, but the structural details of these parts may vary considerably. As described previously, the assembly 18 is preferably a unitary assembly which includes the register mechanism 20, change gears 22 and 24 and the driven magnet 26. The mechanism 20 is a combined gear reduction train and counter so that a separate reduction unit is not required. Conventionally, the register mechanism 20 is mounted between upper and lower plates 44 and 46 which are held in permanent spaced-apart relationship by a plurality of vertical spacer members 48. The upper plate 44 usually forms the dial face of the register and is provided with appropriate indicia and with a rotatable indicating hand 50 which is driven by the register mechanism 20. The change gears 22 and 24 should be accessible and, as shown, are releasably mounted below the lower plate 46 on shafts which pass through the plate 46 and form part of the mechanism 20. The entire assembly 18 is supported by the lower plate 46, the periphery of which is clamped between the register housing flange 36 and an annular shoulder 52 machined in the upper edge of the wall 30. Alternatively, the assembly 18 can be mounted entirely within and supported by the walls of the register housing 32, and in such a construction it is not necessary that the wall 30 be present.

The driver magnet assembly 14 is supported by the wall 28 of the connecting flange 12 and, as shown, it includes a rotatable shaft 54 carrying a permanent magnet 56 at its upper end and a horizontal pin 58 at its lower end for engagement with the drive pin H. The shaft 54 is journalled in a fitting 60 which is secured to the lower surface of the wall 28 with screws 62. The driver magnet 56 and the driven magnet 26 may be of any suitable construction and, as shown, each is constructed in the form of a ring which is secured to a circular plate which in turn is secured to the respective shaft. The two magnets 26 and 56 must, of course, be disposed close to the wall 28 and opposite each other, and the wall 28 must be constructed of non-magnetic material.

The register housing 32 may be of conventional hollow cylindrical construction provided with a transparent viewing lens 64 and hinged cover plate 66 at its upper end. The compartment defined between the housing 32 and the connecting flange 12 is maintained water tight, thereby protecting the assembly 18 from moisture and dirt, and this is a further advantage over the mechanical-drive type of meter wherein it is conventional to provide the register housing with a drainage hole to drain away water which has leaked past the stuffing box.

It will be understood from the above description that the conversion unit 10 will normally be assembled by the manufacturer and subsequently installed by the water utility at the site of an existing mechanical-drive meter without removing the latter from the line. As described previously, installation is accomplished by unbolting and removing the upper portion A (FIGURES 1a and 1b) of the existing mechanical drive meter and then bolting the entire conversion unit 10 to the exposed upper edge of the remaining casing part D (FIGURES 1d and 1e) of the existing meter, making sure that the driven pin 58 of the unit 10 engages properly with the drive pin H. When the existing meter is of the aforementioned frost-bottom type, the connecting flange of the conversion unit is supplied by the manufacturer with an annular wall, corresponding to the wall 31, which is adapted to be soldered or brazed in place rather than provided with bolt holes. The bottom cap and measuring mechanism of the existing meter are temporarily removed, and the upper casing is cut off, following which the conversion unit is soldered or brazed to the remaining casing part of the existing meter.

It will be appreciated from the above that the conversion unit of the present invention permits a water utility to convert its mechanical-drive water meters to magnetic-drive meters quickly and simply and economically without removing the existing split-case meter from the line and without replacing the measuring mechanism and lower casing portion of the old meter. The converted meter then has all the advantages of a new magnetic-drive meter, principally freedom from stuffing box leakage, consequent damage to the register by moisture and location of all gearing in a water-free compartment, at a considerably lesser cost than would be incurred by purchasing and installing a new meter. As described previously, the uniformity among brands of current mechanical-drive meters permits the manufacturer of the conversion unit to supply a connecting flange requiring only slight modifications from a single basic design so as to fit the lower casing portion of substantially any existing mechanical drive meter.

While preferred embodiments of the present invention have been described, further modifications may be made without departing from the scope of the invention. Therefore, it is to be understood that the details set forth or shown in the drawings are to be interpreted in an illustrative, and not in a limiting sense, except as they appear in the appended claims.

What is claimed is:

1. A universal conversion unit for converting any of a variety of conventional mechanical-drive water meters to a magnetic-drive meter so as to dispense with certain semi-obsolete troublesome parts, said conventional meter being of the type comprising a housing having upper and lower wall portions defining between them a water-filled measuring compartment, a water-operated measuring device disposed in the measuring compartment and having an upwardly directed revolvable output shaft, a reduction gear train in the measuring compartment adjacent the upper portion of the housing and cooperating with the output shaft of the measuring device, the gear train having a drive shaft extending through a stuffing box or the like and terminating outside the upper wall portion, and a register cooperating with the drive shaft outside the measuring compartment, said universal conversion unit being adapted to replace the aforementioned upper wall portion of the housing and the parts associated therewith including the gear train, drive shaft, stuffing box and register, said universal conversion unit comprising a universal connecting flange having a downwardly facing opening, imperforate top and sides and a circumferential lower edge dimensioned to mount on the lower wall portion of the aforesaid conventional housing of a mechanical-drive water meter, the dimensions of said lower edge being varied as needed to adapt to a variety of said conventional meter housings, and at least said imperforate top being constructed of non-magnetic material, the central portion of the upper face of said imperforate top defining a horizontal, universal mounting surface for receiving a universal register and register housing, said mounting surface being the same in each of said connecting flanges regardless of variations in the dimensions of said lower edge of said connecting flange so that a single style of register and register housing may be mounted on any of a plurality of connecting flanges;

said universal conversion unit further comprising the following substantially uniform and interchangeable parts: a driver magnet unit positioned centrally of and close to the lower surface of the imperforate top and supported by said connecting flange so as to be engaged and driven by the output shaft of the meter to be converted; a register housing detachably secured to said universal mounting surface of said imperforate top and defining therewith a water-free register chamber, said register housing having an aperture therein closed with a transparent viewing lens; a driven magnet in said register chamber positioned opposite said driver magnet unit; a register in said register chamber having a revolution counting mechanism and an indicating face opposite said viewing lens; a speed-reduction unit in said register chamber cooperating with said driven magnet and with said register for transmitting rotation of said driven magnet to said indicating mechanism, said speed-reduction unit including means for changing the response of said indicating mechanism to rotation of said driven magnet, said means including a pair of intermeshing change gears removably mounted on separate shafts whereby other change gears having different numbers of teeth may be interchangeably mounted on said separate shafts so as to adjust the relationship between the rotation of said driven magnet and the reading on said indicating mechanism;

whereby any of a variety of conventional mechanical-drive water meters may be converted to a magnetic-drive water meter by removing said upper wall portion of said conventional meter together with the parts associated therewith and then mounting said universal conversion unit on the lower wall portion.

2. Apparatus as in claim 1 wherein said register includes upper and lower, spaced-apart plates and connecting means extending between and connected to said plates, said change gears being disposed below said lower plate so as to be accessible and the remainder of said speed reduction unit and said counting mechanism being disposed between and supported by said upper and lower plates.

3. Apparatus as in claim 1 wherein said connecting flange includes a downwardly extending annular wall surrounding said driver magnet and defining said downwardly facing opening.

4. A universal conversion unit as in claim 3 wherein said register includes spaced-apart upper and lower plates and fixed connecting means extending between and connected to said plates, and wherein said speed reduction unit is incorporated between said plates as part of said register, said register being positioned centrally of the universal connecting flange by mounting within the register housing, which is positioned centrally on the universal connecting flange by releasable fasteners.

References Cited

UNITED STATES PATENTS 2,921,468    1/1960    Treff et al. _____ 73—258
3,156,115    11/1964    Adelmann _____ 73—258

JAMES J. GILL, *Primary Examiner.*

R. S. SALZMAN, *Assistant Examiner.*